United States Patent [19]
Kroeger et al.

[11] Patent Number: 5,404,375
[45] Date of Patent: Apr. 4, 1995

[54] PROCESS AND APPARATUS FOR SATELLITE DATA COMMUNICATION

[75] Inventors: Brian W. Kroeger; Richard E. Martinson, both of Sykesville, Md.

[73] Assignee: Westinghouse Electric Corp., Pittsburgh, Pa.

[21] Appl. No.: 110,265

[22] Filed: Aug. 23, 1993

[51] Int. Cl.[6] .............................................. H04K 1/00
[52] U.S. Cl. ...................... 375/200; 380/34; 455/12.1
[58] Field of Search .............. 375/1; 380/34; 342/375; 455/12.1

[56] References Cited

U.S. PATENT DOCUMENTS

| | | | |
|---|---|---|---|
| 4,672,655 | 6/1987 | Koch | 455/12.1 X |
| 4,943,974 | 7/1990 | Motamedi . | |
| 4,980,677 | 12/1990 | Hotta et al. | 455/12.1 X |
| 5,073,900 | 12/1991 | Mallinckrodt | 375/1 |
| 5,084,900 | 1/1992 | Taylor | 375/1 |
| 5,263,047 | 11/1993 | Kotzin et al. | 375/1 |
| 5,278,863 | 1/1994 | Briskman | 375/1 |

FOREIGN PATENT DOCUMENTS

9013186  11/1990  WIPO .......................... 455/12.1 X

Primary Examiner—Tod R. Swann
Attorney, Agent, or Firm—Christopher O. Edwards

[57] ABSTRACT

A system for transmitting and receiving outbound and inbound data signals through a satellite communications network, the system having a network data rate and including a satellite and an end user transceiver, the system comprising a half-duplex mobile transceiver for transmitting and receiving the inbound and outbound data signals, respectively, for spreading the inbound data signal from the network data rate to a reduced data rate having an increased signal-to-noise ratio using a spread sequence, and for despreading the outbound data signal from the reduced data rate to the network data rate. The system also comprises an earth station, coupled to the end user transceiver, for transmitting and receiving the outbound and inbound data signals, wherein the earth station includes means for spreading the outbound data signal from the network data rate to the reduced data rate using the spread sequence, and means for despreading the inbound data signal from the reduced data rate to the network data rate, and wherein the end-user transceiver includes means for transmitting the outbound data signal and for receiving the inbound data signal.

44 Claims, 6 Drawing Sheets

PROCESS AND APPARATUS FOR SATELLITE DATA COMMUNICATION

BACKGROUND OF THE INVENTION

1. Field of the Invention

The present invention relates to a satellite communications network. More particularly, the present invention relates to a process and apparatus for transmitting and receiving data through a satellite communications network.

2. Description of Related Art

At present, a satellite network exists for two-way communication of information. This network, commonly referred to as Mobile Satellite Services ("MSS"), comprises a Communications Ground Segment ("CGS") which consists of a Network Control Center and a Feederlink Earth Station; a satellite; at least one mobile transceiver; and the existing terrestrial telephone (and data) networks.

The satellite of this network handles several thousand communications channels between the mobile transceivers and the CGS. Each of the channels, 6 kHz apart, is modulated at 6750 bits per second. And within the network, data is transmitted at either 4800 or 2400 bits per second ("bps"), depending upon the level of error correction desired.

In the conventional network, several channels are reserved for signalling protocol used to establish all communications connections and the remaining channels for communications. It has been estimated that with this conventional network, more than 2 seconds of access delay is incurred before a circuit switched connection can be established and a channel accessed. Assuming that it takes about the same amount of time to terminate such a connection, and if the transmission of a small packet of data at 4800 bps is negligible, then a minimum data packet requires nearly 5 seconds of satellite time.

Moreover, when communicating information over this network, a signalling channel is used, and it is assumed that the accessed communications channel is always reserved during this interval. Finally, some additional time is required before the terminated accessed channel becomes available to the free channel pool. As a result, a total satellite channel time for a minimum data packet, including signalling, communications, and reservation, is approximately 10 seconds.

Accordingly, any other scheme used in conjunction with the conventional network that would require less than 10 seconds to transmit a minimum data packet would be more efficient than the conventional system. In addition, the standard mobile transceiver is relatively expensive because it uses an expensive antenna and low noise components in the receiver and operates in full-duplex mode, which requires a costly diplexer as well as other costly components. Finally, the MSS protocol is complex and requires significant memory and processing power.

In light of the foregoing, a need exists for a low cost alternative for transmitting small packets of data through the 20 preexisting, conventional satellite communications network. A need also exists for a low cost mobile transceiver that can be used in the existing MSS network.

SUMMARY OF THE INVENTION

Accordingly, the present invention is directed to an inexpensive process and system, as well as an inexpensive transceiver, for transmitting and receiving data through a satellite communications network.

Additional features and advantages of the invention will be set forth in part in the description that follows, and in part will be apparent from the description, or may be learned by practice of the invention. The objects and advantages of the invention will be realized and attained by the system and process particularly pointed out in the written description and claims in this application, as well as in the appended drawings.

To achieve the advantages of the invention and in accordance with the purpose of the invention, as embodied and broadly described herein, the invention is a method for transmitting and receiving outbound and inbound data signals through a satellite communications network, the network having a network data rate and a plurality of channels for transmitting and receiving information, the network including a satellite and an end user transceiver. The method comprises the steps of operating a mobile transceiver in a half-duplex mode; transmitting the outbound data signal from the end user transceiver to an earth station, the earth station coupled to the user transceiver; processing the outbound data signal at the earth station, including spreading the outbound data signal from the network data rate to a reduced data rate having an increased signal-to-noise ratio using a spread sequence; transmitting, from the earth station, over one of the plurality of channels, and through the satellite, the processed outbound data signal; receiving the transmitted outbound data signal at the mobile transceiver; processing the received outbound data signal, including despreading the transmitted outbound data signal; processing the inbound data signal, including spreading the inbound data signal from the network data rate to the reduced data rate using the spread sequence; transmitting, from the mobile transceiver, over the one of the plurality of channels, and through the satellite, the processed inbound data signal; receiving and despreading the transmitted inbound data signal at the earth station; and receiving the despread inbound data signal at the end user transceiver.

In another aspect, the present invention is a system for transmitting and receiving outbound and inbound data signals through a satellite communications network, the system having a network data rate and including a satellite and an end user transceiver. The system comprises a half-duplex mobile transceiver for transmitting and receiving the outbound and inbound data signals, respectively, the mobile transceiver comprising means for spreading the inbound data signal from the network data rate to a reduced data rate having an increased signal-to-noise ratio using a spread sequence, and means for despreading the outbound data signal from the reduced data rate to the network data rate; an earth station, coupled to the end user transceiver, for transmitting and receiving the outbound and inbound data signals, wherein the earth station includes means for spreading the outbound data signal from the network data rate to the reduced data rate using the spread sequence, and for despreading the inbound data signal from the reduced data rate to the network data rate; and wherein the end-user transceiver includes means for transmitting the outbound data signal and for receiving the inbound data signal.

In another aspect, the present invention is a method for receiving and transmitting outbound and inbound data signals through a satellite communications network having a transmission frequency band and a base frequency band, the method comprising: translating the outbound data signal into in-phase and quadrature-phase outbound data signals; transforming the in-phase and quadrature-phase outbound data signals from the transmission frequency band to the base frequency band; converting from analog to digital the transformed outbound data signals; demodulating, synchronizing, and despreading the digital outbound data signals; modulating, spreading, and translating into in-phase and quadrature-phase inbound data signals the inbound data signal; converting from digital to analog the modulated and spread in-phase and quadrature-phase inbound data signals; and transforming the analog inbound data signals from the base frequency band to the transmission frequency band.

In yet another aspect, the present invention is a transceiver for transmitting and receiving outbound and inbound data signals through a satellite communications network, the transceiver operating in a half-duplex mode and having a base frequency band and a transmission frequency band. The transceiver comprises a plurality of first mixers for transforming the outbound data signal from the transmission frequency band to the base frequency band, and for translating the outbound data signal into in-phase and quadrature-phase outbound data signals; a plurality of analog-to-digital converters, coupled to the plurality of first mixers, for converting from analog to digital the transformed and translated outbound data signals; a digital signal processor, coupled to the plurality of analog-to-digital converters, for demodulating, synchronizing, and despreading the digital outbound data signals, and for modulating, spreading, and translating into in-phase and quadrature-phase inbound data signals the inbound data signal; a plurality of digital-to-analog converters, coupled to the digital signal processor, for converting from digital to analog the spread and modulated in-phase and quadrature-phase inbound data signals; and a plurality of second mixers, coupled to the digital-to-analog converters, for transforming the analog in-phase and quadrature-phase inbound data signals from the base frequency band to the transmission frequency band.

It is to be understood that both the forgoing general description and the following detailed description are exemplary and explanatory only and are not restrictive of the invention, as claimed.

The accompanying drawings are included to provide a further understanding of the invention and are incorporated in and constitute a part of this specification, to illustrate the embodiments of the invention, and, together with the description, to serve to explain the principles of the invention.

DETAILED DESCRIPTION OF THE INVENTION

Reference will now be made in detail to the present preferred embodiments of the invention, examples of which are illustrated in the accompanying drawings. Wherever possible, the same reference numbers will be used throughout the drawings to refer to the same or like parts.

In accordance with the present invention, a method and system are provided for transmitting and receiving data signals through a satellite communications network. The system comprises a satellite, an end user transceiver, an earth station, and a half-duplex mobile transceiver.

Figure 1:
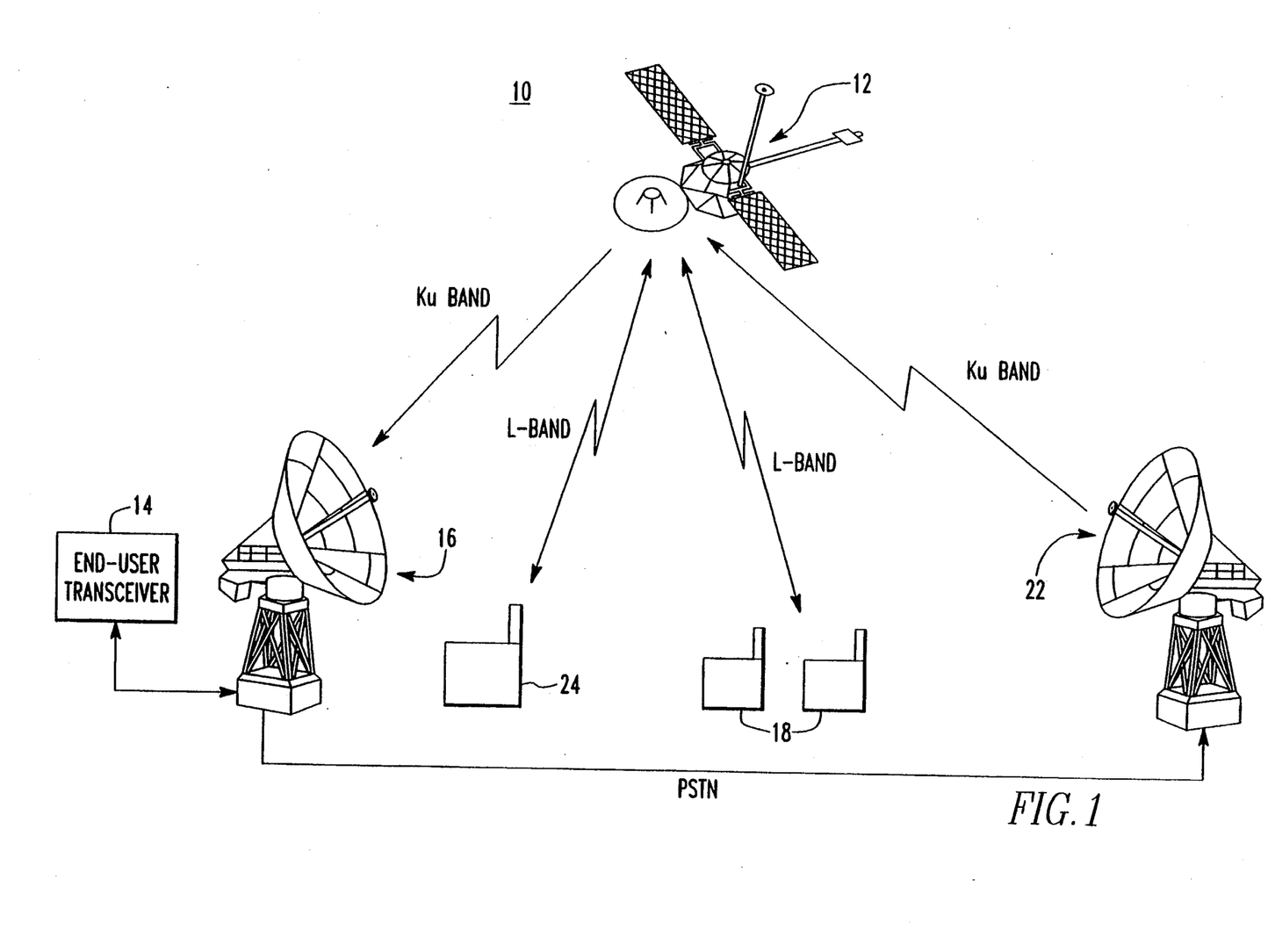
FIG. 1 is a diagrammatical representation of a system made in accordance with the present invention for transmitting and receiving inbound and outbound data signals through a satellite communications network.

An exemplary embodiment of the system of the present invention is shown in FIG. 1 and is designated generally by reference numeral 10.

As herein embodied and shown in FIG. 1, the system for transmitting and receiving data signals through a satellite communications network 10 includes a satellite 12, an end user transceiver 14, an earth station 16, a half-duplex mobile transceiver 18, a second earth station 22, and a second mobile transceiver 24. The earth station 16 is coupled to both the end-user transceiver 14 and the second earth station 22 through the public service telephone network ("PSTN"). The details of this invention are described below.

The satellite exists in the conventional network and may be equipped to handle several thousand communications channels. Each of the channels are spaced 6 kHz apart and operate at a network data rate of 6750 bits per second. Through these channels, data may be transmitted at either 4800 or 2400 bps, depending on the level of forward error correction desired. As is well-known, several of the channels are reserved for signalling protocol and are used to establish all communications connections. MSS protocols are described in "Communications Ground Segment (CGS) Specification," Book 3 of 3, Vol. 7, Mobile Earth Terminal Lower Level Specifications, §5.3.3 Protocols (Link and Upper Earth Terminal Lower Layers), at pp 5–19 through 5–51, Doc. MSS - Doc. 1021 (Revision E, Jun. 4, 1992) (available from American Mobile Satellite Corp./Telesat Mobile, Inc., Mobile Satellite Services).

The end user transceiver 14 permits transmission and reception of data signals through the system at the network data rate of 6750 bps.

The earth station 16 receives outbound signals from the end user transceiver 14 and transmits those signals to the satellite 12. Outbound signals, therefore, are those signals transmitted from an earth based transmitter, through a satellite, and to a mobile receiver. The earth station also receives inbound signals from the satellite and relays those signals to the end user transceiver through the PSTN. Inbound signals, therefore, are those signals transmitted from a mobile transmitter, through a satellite, and to an earth based receiver.

The half-duplex mobile transceiver 18 transmits L-Band inbound data signals to the satellite 12 and receives L-Band outbound data signals from the satellite. The mobile transceiver 18 transmits and receives data signals at the network data rate of 6750 bps.

In this system, to be able to use an inexpensive mobile transceiver 18, the effective information rate per channel must be reduced from the network data rate of 6750 bps to several hundred bps. For example, the information rate can be reduced by a factor of 10, i.e., one information bit per 10 signalling bits. This is accomplished using a spread sequence, which is used to increase the signal to noise ratio by the spread factor. Thus, using a predetermined spread sequence, the data to be sent through the system will be spread such that the effective information rate is reduced by the spread factor.

However, the signal power of the L-Band inbound data signal received at the satellite 12 from the mobile transceivers 18 is also reduced by the spread factor. The satellite converts the inbound data signal from L-Band to Ku-Band and relays this reduced power signal to the second earth station 22. Yet this signal is likely to be below the second earth station's normal detectability threshold. This is because the second earth station, part of the conventional network, is designed to receive signals with a power level appropriate for the 6750 bps network data rate, and does not take into account the spread factor and the increased signal to noise ratio resulting from the reduced data rate. Accordingly, the system utilizes an additional, Ku-Band receiver, i.e., the earth station 16, to receive the data sent from the mobile transceivers 18 through the satellite 12.

The earth station 16 and the second earth station 22 are connected via a telephone or modem/data link through the PSTN. The earth station 16 uses this link to place a call, using the conventional network protocol, through the second earth station 22 and the satellite 12 to the second mobile transceiver 24. The second earth station 22 transmits at Ku-Band, and the satellite 12 converts the Ku-Band signal to L-Band and transmits the L-Band signal to the second mobile transceiver 24.

In this way, the MSS Bulletin Board and signalling channels are used in the conventional protocol by the second mobile transceiver 24 and the second earth station 22 to establish a normal circuit switched connection. With this connection established, data carl be transmitted from the end user transceiver 14 over the PSTN to the earth station 16, over the PSTN to the second earth station 22, through the airwaves to the satellite 12, and back down through the airwaves to both the mobile transceivers 18 and the second mobile transceiver 24. Through the same established connection, data can be sent from the mobile transceivers 18 up through the airwaves to the satellite 12, down through the airwaves where it is received by the earth station 16, which in turn transmits the data over the PSTN to the end user transceiver 14.

When transmitting outbound data from the end user transceiver 14 to the mobile transceivers 18, the earth station 16 is used to spread the data using a predetermined spread sequence. Conversely, when data is transmitted from the mobile transceivers 18 to the end user transceiver 14, the earth station 16 is used to despread the inbound data using a despread sequence complementary to the spread sequence.

Figure 2:
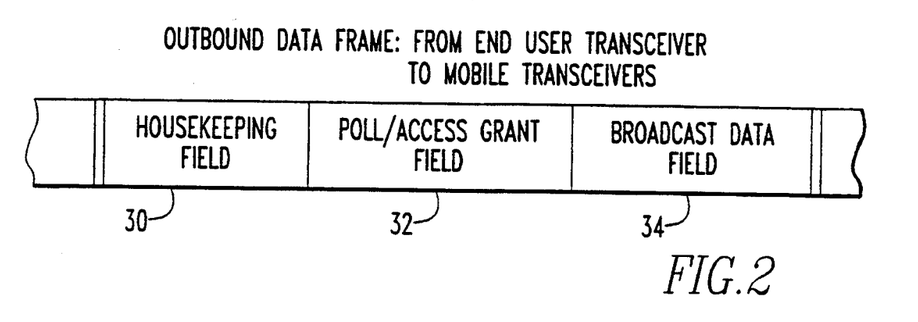
FIG. 2 shows an outbound data frame.

Once the circuit switched connection is established, outbound data sent to the mobile transceivers 18 from the end-user transceiver 14 is framed into three fields as shown in FIG. 2. The first field is a housekeeping field 30, which provides system timing reference for the purpose of maintaining time division multiplexing ("TDM") slots, communicates other network related data, and indicates dynamic field boundaries. By dynamic field boundaries, it is meant that a field is not limited to a single width, and thus can contain a variable amount of information. TDM slots permit a number of mobile transceivers 18 on the same frequency to share a channel. The second field is a poll/access grant field 32. The poll/access grant field 32 polls mobile transceivers 18 so that they can receive data, and grants access, i.e., assigns a response slot, to mobile transceivers when requested. The third field is a broadcast data field 34, which contains the outbound data to be received by the mobile transceivers.

Figure 3:
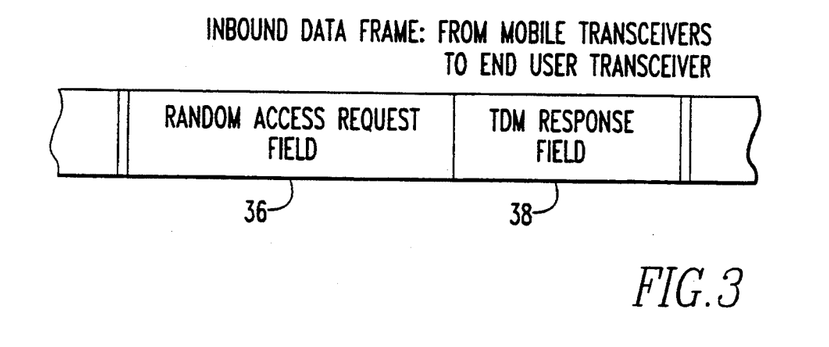
FIG. 3 shows an inbound data frame.

Inbound data, sent from the mobile transceivers 18 to the end user transceiver 14, is framed into two fields, as shown in FIG. 3. The first field is the random access request field 36, which accommodates a random access protocol, such as the slotted ALOHA scheme. The slotted Aloha protocol is well-known in the art, and is described in Andrew Tanenbaum, "Computer Networks," pp. 253–57 (Prentice-Hall 1981). The random access protocol is used by mobile transceivers 18 when requesting to send packets of inbound data through the system. The second field is a TDM response field 38, in which the data packets sent from the mobile transceivers are transmitted. Mobile transceivers 18 can transmit data in the TDM portion of the inbound data frame when they are polled by the poll/access grant field 32 of an outbound data signal. Alternatively, the mobile transceivers 18 may contend for access to the established channel through the random access request field 36.

Figure 4:
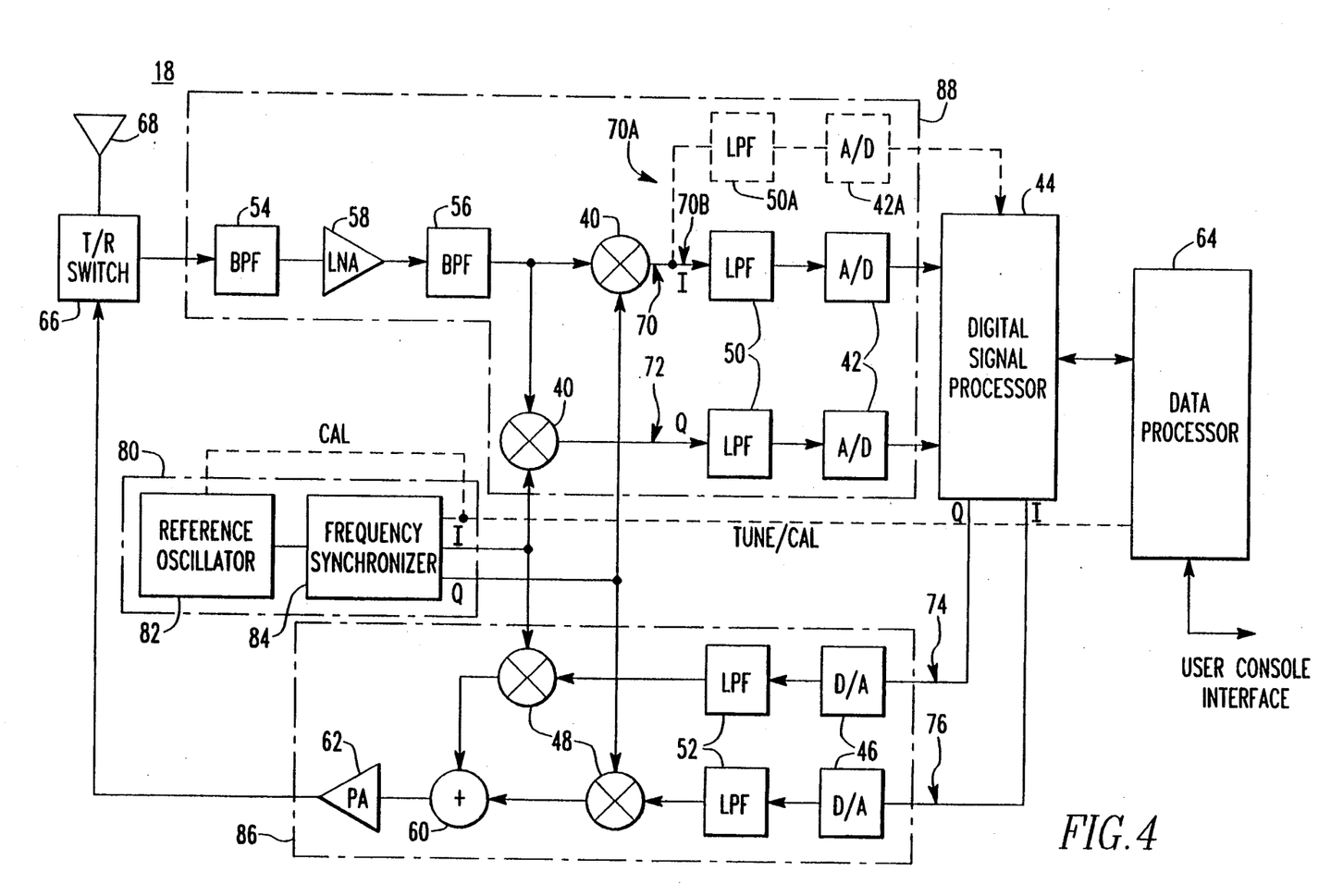
FIG. 4 is a diagrammatical representation of a transceiver made in accordance with the present invention for transmitting and receiving inbound and outbound data signals through a satellite communications network.

As shown in FIG. 4, a mobile transceiver 18 includes a plurality of first mixers 40, a plurality of analog-to-digital converters 42, a digital signal processor 44, a plurality of digital-to-analog converters 46, a plurality of second mixers 48, a plurality of first low-pass filters 50, a plurality of second low-pass filters 52, a first band-pass filter 54, a second band-pass filter 56, a low-noise amplifier 58, an adder 60, an amplifier 62, a data processor 64, a transmit/receive switch 66, and an antenna 68, and a device for automatically calibrating frequencies 70. The details of the mobile transceiver are described below.

Outbound data signals can be received with an inexpensive antenna 68, which is preferably the same type of antenna used for receiving Global Positioning Systems ("GPS") signals received from satellites. Such antennas are well-known in the art and available commercially from, for example, MICRO PULSE, 409 Calle San Pablo, Camarillo, CA 93012.

Because the system operates in half-duplex mode, a transmit/receive switch 66 can be used in place of a diplexer. The transmit/receive switch 66 is placed in the transmit mode when inbound signals are being sent from the mobile transceivers 18, and is placed in the receive mode when outbound signals are being received by the mobile transceivers 18.

A receiving chain 88 processes the outbound data signals using several elements. The first band-pass filter ("BPF") 54 limits the frequency bandwidth of the outbound data signal and is used to satisfy the dynamic range requirement for the low-noise amplifier 58, which is used to amplify the outbound data signal. The second BPF 56 further reduces the bandwidth of the outbound data signal to limit the dynamic range requirement for the first mixers 40.

The first mixers 40 are used to translate the outbound data signal directly into a complex signal having an in-phase component 70 and a quadrature-phase component 72, i.e., a component 90° out of phase with the in-phase signal 70. The first mixers 40 are also used to transform the outbound data signal from a transmission frequency band to a base frequency band. Preferably, the transmission frequency band is centered around the L-Band frequency, and the base frequency band is centered around zero Hertz.

The plurality of first low-pass filters 50 and the plurality of analog-to-digital converters 42 provide a band limited digital baseband signal to the digital signal processor ("DSP") 44.

The DSP 44 then performs the functions of demodulation, synchronization, and despreading of the in-phase 70 and quadrature-phase 72 outbound data signals. Although conventional circuit components can be used in the DSP to reduce the cost of the mobile transceiver 18, preferably a CMOS Application Specific Integrated Circuit ("ASIC") will be used for various processing functions. For example, the ASIC can be used for fine-tuning and bandwidth compression of the spread outbound data signals. Moreover, the ASIC can be used together with other processing components to demodulate outbound signals. A sigma-delta analog-to-digital converter can be incorporated with the ASIC to further reduce cost of the mobile transceiver 18. The data processor 64 provides the interface between the DSP 44 and the user of the outbound data.

One of the advantages of the inexpensive mobile transceiver 18 is that it can receive both GPS signals as well as short-packet data signals sent through the MSS network. To achieve this capability on the in-phase path 70, the mobile transceiver 18 may include a pair of low-pass filters 50A and a pair of analog-to-digital converters 42A. Because the bandwidth of a GPS signal is wider than the bandwidth of a short-packet data signal sent through the MSS network, the in-phase path 70 can be split, creating pathways 70A for GPS signals and pathway 70B for MSS signals. Thus, it may be more economical to separate the pathways as described and provide a pair of in-phase low-pass filters 50 and 50A and a pair of analog-to-digital converters 42 and 42A, rather than providing a single such filter and converter. Nevertheless, even using a pair of filters and converters, it is still possible to share a common DSP 44. Here, again, the ASIC can be used to preprocess the wideband GPS signals to accommodate the narrowband processes of an MSS channel. By using an ASIC, a down-conversion scheme and DSP post processing components that are common to both MSS and GPS signals can be used.

To transmit inbound data signals over the MSS network, the mobile transceiver 18 includes a transmission chain 86. To transmit inbound signals, the DSP 44 modulates and spreads an inbound data signal and translates it into in-phase 74 and quadrature-phase 76 components. Each of the components is converted, using a digital-to-analog converter 46, from digital into analog signals. Subsequently, the analog converted components pass through low-pass filters 52 to provide bandlimited in-phase 74 and quadrature-phase 76 components of the inbound data signal.

After passing through the filters 52, the in-phase 74 and quadrature-phase 76 inbound data signals are mixed using second mixers 48 and are transformed from the base frequency band to the transmission frequency band, e.g., the L-Band. The transformed inbound data signals are then added, using an adder 60, creating a single transmission signal. The transmission signal is amplified by an amplifier 62, passed through the transmit/receive switch 66 while in its transmit mode, and radiated by the antenna 68. In this way, inbound L-Band data signals can be sent to the satellite 12.

The automatic calibration device 80 includes a reference oscillator 82 and a frequency synchronizer 84. As is well-known in the art, together, the reference oscillator 82 and the frequency synchronizer 84 generate in-phase and quadrature-phase tuning frequency signals. The tuning frequency signals are in turn used in converting from the transmission frequency band to the base frequency band, and from the base frequency band to the transmission frequency band. For a more detailed understanding of a preferred embodiment of the automatic calibration device 80, reference is made to U.S patent application No. 08/110,266, by William McGann, Brian Kroeger, Norman Mathews, and Abraham Friedberg, entitled system and Process for Generating a Reference Frequency in a Mobile Satellite Communication Terminal, filed concurrently herewith, which patent application is incorporated by reference, and is assigned to the same assignee of the present invention.

Figure 5A:
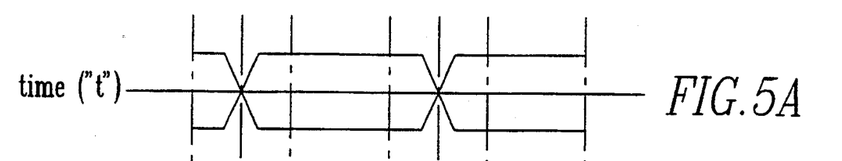
FIG. 5A shows the waveform of an in-phase inbound data signal outputted from a digital signal processor.
Figure 5B:
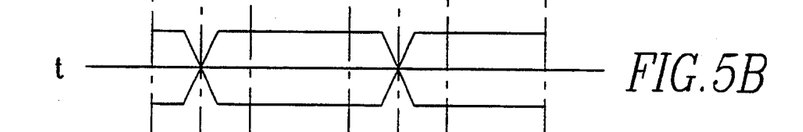
FIG. 5B shows a waveform of a quadrature-phase inbound data signal outputted from a digital signal processor.
Figure 5C:
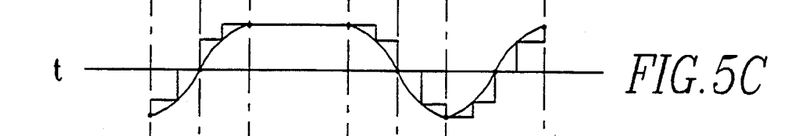
FIG. 5C shows a waveform of an in-phase inbound data signal outputted from a digital-to-analog converter.
Figure 5D:
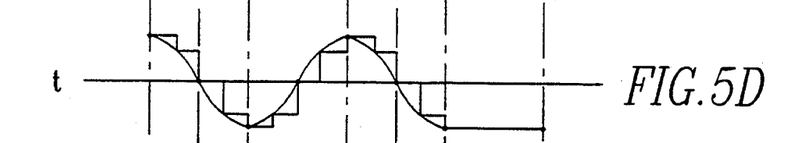
FIG. 5D shows a waveform of a quadrature-phase inbound data signal outputted from a digital-to-analog converter.
Figure 5E:
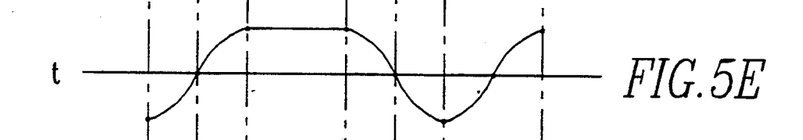
FIG. 5E shows a waveform of an in-phase inbound data signal outputted from a low-pass filter.
Figure 5F:
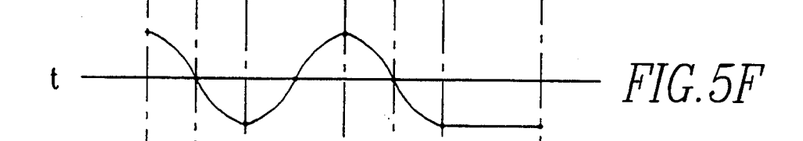
FIG. 5F shows a waveform of a quadrature-phase inbound data signal outputted from a low-pass filter.
Figure 5G:
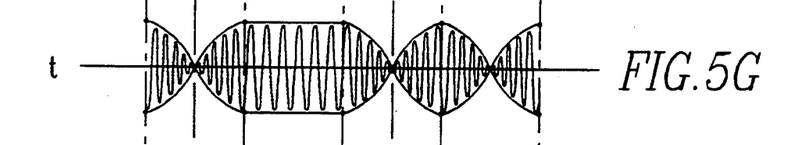
FIG. 5G shows a waveform of an in-phase inbound data signal outputted from a mixer.
Figure 5H:
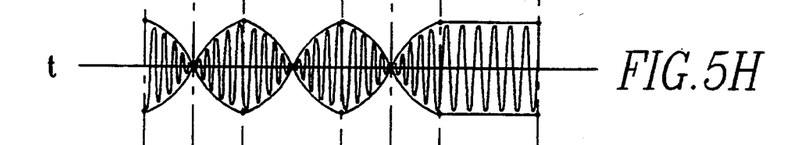
FIG. 5H shows a waveform of a quadrature-phase inbound data signal outputted from a mixer.
Figure 5I:
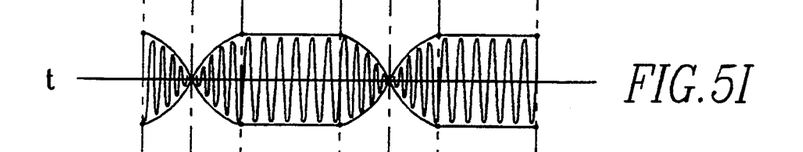
FIG. 5I shows a waveform of an inbound transmission signal outputted from an adder.
Figure 5J:
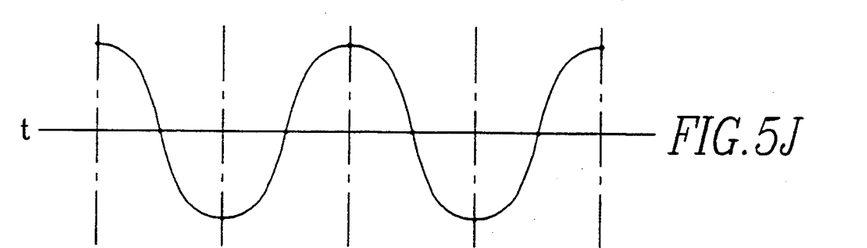
FIG. 5J shows an in-phase tuning frequency signal outputted from a frequency synchronizer.
Figure 5K:
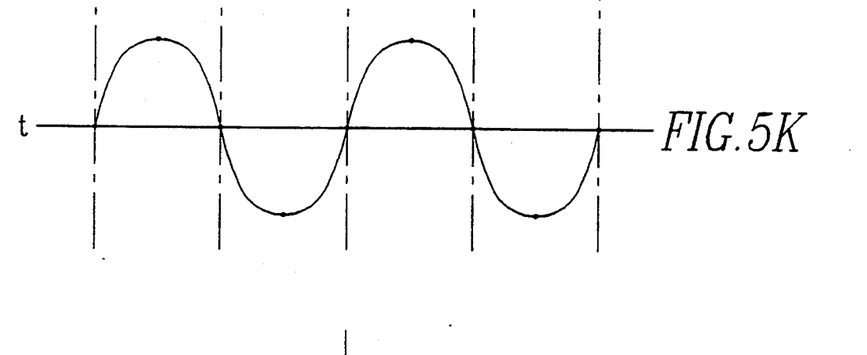
FIG. 5K shows a quadrature-phase tuning frequency signal outputted from a frequency synchronizer.

FIGS. 5A through 5I show waveforms representative of an inbound data signal as it passes through the transmission chain 86. As shown in FIGS. 5A and 5B, respectively, the digital signal processor 44 outputs in-phase and quadrature-phase digital signals 74 and 76. These digital signals pass through digital-to-analog converters 46, where the in-phase and quadrature-phase signals are converted from digital to analog, as shown in FIGS. 5C and 5D, respectively. To remove any unwanted signal components, the analog in-phase and quadrature phase signals pass through low-pass filters 52, as shown in FIGS. 5E and 5F, respectively. The signals are then inputted into mixers 48, where they are mixed with the in-phase and quadrature-phase tuning frequency signals, as represented in FIGS. 5J and 5K, respectively, which tuning frequency signals are generated by the automatic calibration device 80. The in-phase and quadrature-phase signals outputted from the mixers 48 are shown in FIGS. 5G and 5H, respectively. Those signals are then added by an adder 60, creating the L-Band transmission signal shown in FIG. 5I.

As for the receiving chain 88 of the mobile transceiver 18, the signals are the complement of those shown in FIGS. 5A through 5I. And the tuning frequency signals are the same as those shown in FIGS. 5J and 5K.

Figure 5L:
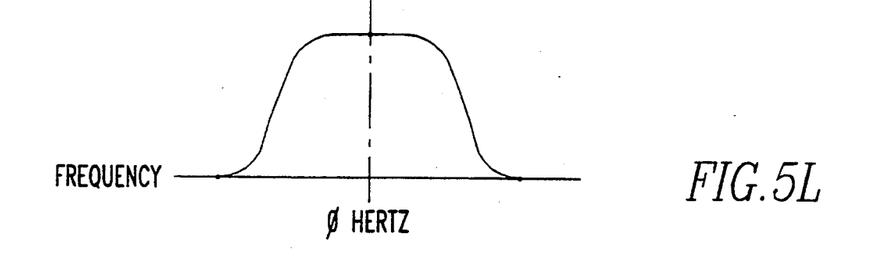
FIG. 5L shows a spectral plot for in-phase and quadrature-phase outbound data signals outputted from mixers.
Figure 5M:
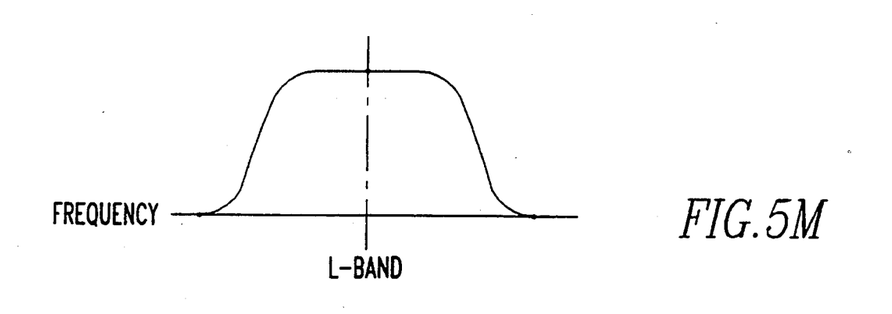
FIG. 5M shows a spectral plot for in-phase and quadrature-phase inbound data signals outputted from mixers.

FIG. 5L shows a spectral plot for the in-phase and quadrature-phase signals as they exist on the transmission chain 86 between the mixers 48 and the low-pass filters 52, and on the receiving chain 88 between the mixers 40 and the low-pass filters 50. FIG. 5M shows a spectral plot for the in-phase and quadrature-phase outbound data signals before being inputted into the mixers 40, as well as a spectral plot for the in-phase and quadrature-phase inbound data signals after being outputted from the mixers 48.

A second embodiment of the invention will now be described where like or similar parts are identified throughout the drawings by the same referenced characters. The second exemplary embodiment of the system of the present invention is shown in FIG. 6 and is designated generally by reference numeral 90.

Figure 6:
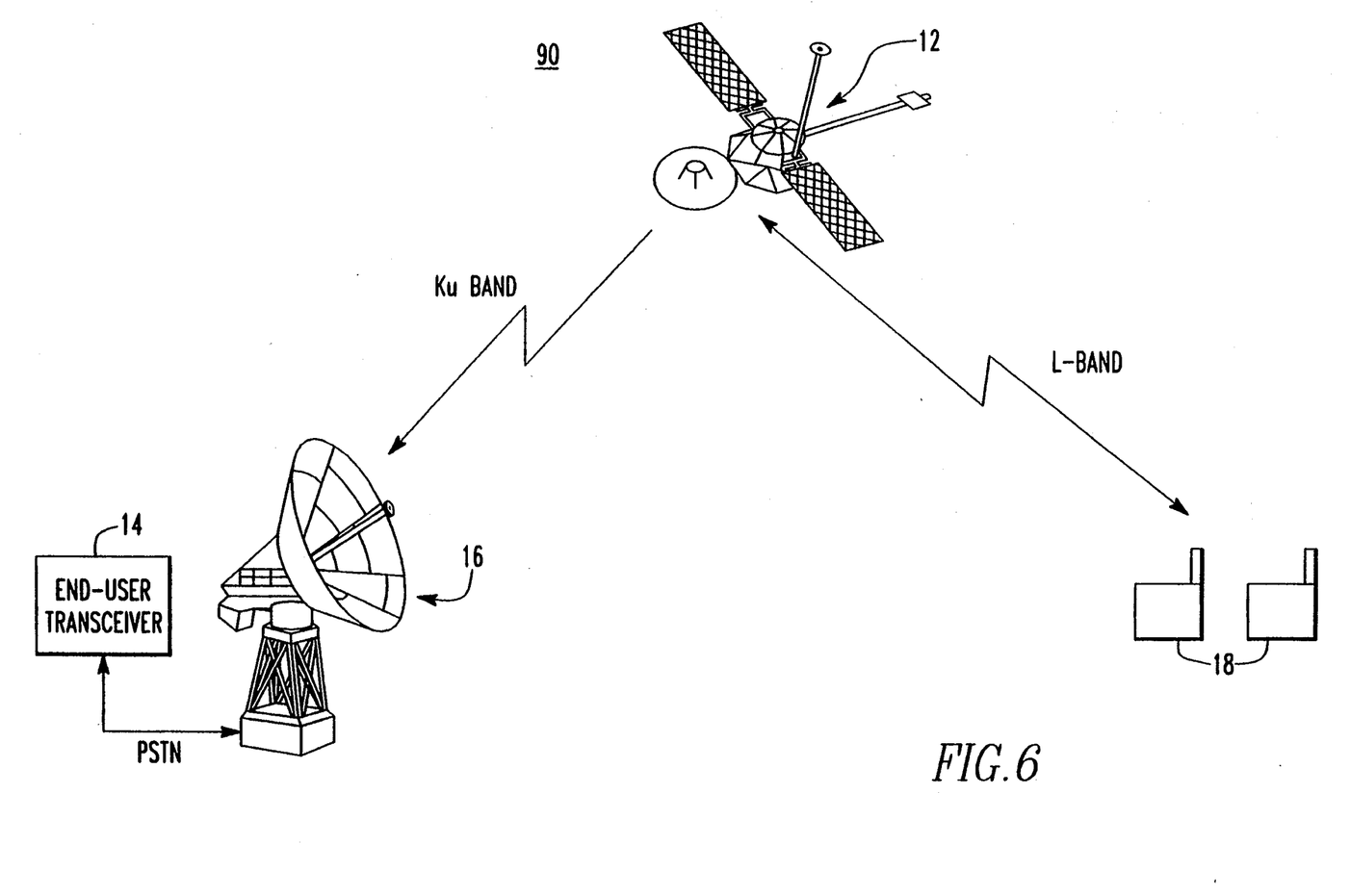
FIG. 6 is a diagrammatical representation of an alternative embodiment of a system made in accordance with the present invention for transmitting and receiving inbound and outbound data signals through a satellite communications network.

As herein embodied and shown in FIG. 6, the system for transmitting and receiving data signals through a satellite communications network 90 includes a satellite 12, an end-user transceiver 14, an earth station 16, and half-duplex mobile transceivers 18. The earth station 16 is coupled to the end-user transceiver 14 through the PSTN. The details of this invention are described below.

In this second embodiment, an end user leases one of the channels in the preexisting network, which channel will then be dedicated to use by only the end-user. Thus, the satellite 12 acts as a "bent pipe" in the sky, relaying signals from the earth station 16 to the mobile transceivers 18. The satellite 12 also converts the outbound data signals bound for the mobile transceivers 18 from Ku-Band to L-Band, and the inbound data signals bound for the earth station 16 from L-Band to Ku-Band. The earth station 16 includes a Ku-band transmitter and receiver, and performs land-based communications through the PSTN directly with the end-user transceiver 14. The outbound and inbound data signals are framed as shown in FIGS. 2 and 3, respectively.

Because only the end-user has access to the dedicated channel, communications can occur directly from the end-user transceiver 14 through the PSTN to the earth station 16, which spreads the data and directly transmits it to the satellite 12, which in turn transmits the signal to the mobile transceivers 18. Similarly, the mobile transceivers 18 can directly transmit data signals through the satellite 12 and down to the earth station 16, which then despreads the data transmitted from the satellite and transmits the despread data through the PSTN to the end-user transceiver 14.

It will be apparent to those skilled in the art that various modification and variations can be made in the system of the present invention without departing from the spirit or scope of the invention. Thus, it is intended that the present invention cover the modifications and variations of this invention, provided they come within the scope of the appended claims and their equivalence.

What is claimed is:

1. A method for transmitting and receiving outbound and inbound data signals through a satellite communications network, said network having a network data rate and a plurality of channels for transmitting and receiving information, said network including a satellite and an end user transceiver, the method comprising the steps of:

operating a mobile transceiver in a half-duplex mode;

spreading and transmitting the outbound data signal through one of said plurality of channels, including spreading said outbound data signal from said network data rate to a reduced data rate having an increased signal-to-noise ratio using a spread sequence, and transmitting the spread outbound data signal from the end user transceiver through an earth station, coupled to the end user transceiver, and through the satellite;

receiving and despreading the spread outbound data signal by the mobile transceiver;

spreading and transmitting the inbound data signal through said one of said plurality channels, including spreading said inbound data signal from said network data rate to a reduced data rate having an increased signal-to-noise ratio using a spread sequence, and transmitting the spread inbound data signal from the mobile transceiver, through the satellite, and through the earth station; and receiving and despreading the spread inbound data signal by said end user transceiver.

2. A method for transmitting and receiving outbound and inbound data signals through a satellite communications network, said network having a network data rate and a plurality of channels for transmitting and receiving information, said network including a satellite and an end user transceiver, the method comprising the steps of:

operating a mobile transceiver in a half-duplex mode including operating the mobile transceiver in a base frequency band and a transmission frequency band;

spreading and transmitting the outbound data signal through one of said plurality of channels, including spreading said outbound data signal from said network data rate to a reduced data rate having an increased signal-to-noise ratio using a spread sequence, and transmitting the spread outbound data signal from the end user transceiver through an earth station, coupled to the end user transceiver, and through the satellite;

receiving and despreading the spread outbound data signal by the mobile transceiver including translating the outbound data signal into in-phase and quadrature-phase outbound data signals, transforming the in-phase and quadrature-phase outbound data signals from said transmission frequency band to said base frequency band, converting the transformed outbound data from analog to digital signals, and demodulating, despreading, and synchronizing the digital outbound data signals; and spreading and transmitting the inbound data signal through said one of said plurality. channels, including spreading said inbound data signal from said network data rate to a reduced data rate having an increased signal-to-noise ratio using a spread sequence, and transmitting the spread inbound data signal from the mobile transceiver, through the satellite, and through the earth station including modulating and spreading said inbound data signal, translating the modulated and spread inbound signal into in-phase and quadrature-phase inbound data signals, digital-to-analog converting the in-phase and quadrature-phase inbound data signals, and transforming the digital-to-analog converted inbound data signals from said base frequency band to said transmission frequency band; and receiving and despreading the spread inbound data signal by said end user transceiver.

3. The method recited in claim 2, wherein the step of receiving and despreading of the spread outbound data signal further comprises the substeps of: amplifying and narrowing the transmission frequency band of said outbound data signal;

limiting said base frequency band of the transformed outbound data signals; and wherein the step of spreading and transmitting the inbound data signal further comprises the substeps of: limiting the base frequency band of the analog-to-digital converted data signals, adding said transformed data signals to obtain a transmission signal, and amplifying said transmission signal.

4. The method recited in claim 3, wherein said transformed in-phase outbound data signal has a predetermined wide bandwidth or a predetermined narrow bandwidth;

wherein the substep of limiting the base frequency band of the transformed in-phase outbound data signal includes a first limiting of the frequency band if the transformed in-phase outbound data signal is of the predetermined narrow bandwidth, or a second limiting of the frequency band if the transformed in-phase outbound data signal is of the predetermined wide bandwidth; and wherein the substep of converting the transformed in-phase outbound data signal from analog to digital includes a first conversion if the transformed in-phase outbound data signal is of the predetermined narrow bandwidth, or a second conversion if the transformed in-phase outbound data signal is of the predetermined wide bandwidth.

5. The method recited in claim 2, further comprising the step of generating a tuning frequency;

wherein said substep of transforming from said transmission frequency band to said base frequency band is performed in accordance with said tuning frequency; and wherein said substep of transforming from said base frequency band to said transmission frequency band is performed in accordance with said tuning frequency.

6. The method recited in claim 1, wherein the step of receiving and despreading the spread outbound data signal further comprises the substep of collecting outbound data signals in the range of 1570 MHz to 1580 MHz.

7. The method recited in claim 1, wherein the steps of spreading and transmitting said outbound data signal includes transmitting a housekeeping field, transmitting a poll/access grant field, and transmitting a broadcast data field; and wherein the step of spreading and transmitting said inbound data signal includes transmitting a random access request field and transmitting a data response field.

8. The method recited in claim 1, wherein said network further includes a second earth station and a second mobile transceiver; and wherein said steps of transmitting the outbound data signal and transmitting the inbound data signal through one of said plurality of channels each includes transmitting said outbound and inbound data signals through a communications path coupling said end user transceiver, said earth station, said second earth station, said satellite, said mobile transceiver, and said second mobile transceiver.

9. A method for transmitting and receiving outbound and inbound data signals through a satellite communications network, said network having a network data rate and a plurality of channels for transmitting and receiving information, said network including a satellite and an end user transceiver, the method comprising the steps of:

operating a mobile transceiver in a half-duplex mode including operating the mobile transceiver in a base frequency band and in a transmission frequency band;

spreading and transmitting the outbound data signal through one of said plurality of channels, including Spreading said outbound data signal from said network data rate to a reduced data rate having an increased signal-to-noise ratio using a spread sequence, and transmitting the spread outbound data signal from the end user transceiver through an earth station, coupled to the end user transceiver, and through the satellite;

receiving and despreading the spread outbound data signal by the mobile transceiver including translating the outbound data signal into in-phase and quadrature-phase outbound signals, transforming the in-phase and quadrature-phase outbound data signals from said transmission frequency band to said base frequency band, analog-to-digital converting the transformed outbound data signals, and demodulating, despreading, and synchronizing the analog-to-digital converted outbound data signals;

spreading and transmitting the inbound data signal through said one of said plurality channels, including spreading said inbound data signal from said network data rate to a reduced data rate having an increased signal-to-noise ratio using a spread sequence, and transmitting the spread inbound data signal from the mobile transceiver,. through the satellite, and through the earth station including modulating and spreading said inbound data signal, translating the modulated and spread inbound signal into in-phase and quadrature-phase inbound data signals, digital-to-analog converting the in-phase and quadrature-phase inbound data signals, and transforming the digital-to-analog converted inbound data signals from said base frequency band to said transmission frequency band; and receiving and despreading the spread inbound data signal by said end user transceiver;

said network further includes a second earth station and a second mobile transceiver; and wherein said steps of transmitting the outbound data signal and transmitting the inbound data signal through one of said plurality of channels each includes transmitting said outbound and inbound data signals through a communications path coupling said end user transceiver, said earth station, said second earth station, said satellite, said mobile transceiver, and said second mobile transceiver.

10. The method recited in claim 9, wherein the step of receiving and despreading the spread outbound data signal further comprises the substeps of: amplifying and narrowing the transmission frequency band of said outbound data signal, limiting said base frequency band of the transformed outbound data signals; and wherein the step of spreading and transmitting the inbound data signal further comprises the substeps of: limiting the base frequency band of the analog-to-digital transformed data signals, adding said transformed data signals to obtain a transmission signal, and amplifying said transmission signal.

11. The method recited in claim 10, wherein said transformed in-phase outbound data signal has a predetermined wide bandwidth or a predetermined narrow bandwidth;

wherein the substep of limiting the base frequency band of the transformed in-phase outbound data signal includes a first limiting of the frequency band if the transformed in-phase outbound data signal is of the predetermined narrow bandwidth, or a second limiting of the frequency band if the transformed in-phase outbound data signal is of the predetermined wide bandwidth; and wherein the substep of converting the transformed in-phase outbound data signal from analog-to-digital includes a first conversion if the transformed in-phase outbound data signal is of the predetermined narrow bandwidth, or a second conversion if the transformed in-phase outbound data signal is of the predetermined wide bandwidth.

12. The method recited in claim 9, further comprising the step of generating a tuning frequency;

wherein said substep of transforming from said transmission frequency band to said base frequency band is performed in accordance with said tuning frequency; and wherein said substep of transforming from said base frequency band to said transmission frequency band is performed in accordance with said tuning frequency.

13. The method recited in claim 8, wherein the step of receiving and despreading the outbound data signal further comprises the substep of collecting outbound data signals in the range of 1570 MHz to 1580 MHz.

14. The method recited in claim 8, wherein the step of spreading and transmitting said outbound data signal includes transmitting a housekeeping field, transmitting a poll/access grant field, and transmitting a broadcast data field; and wherein the step of spreading and transmitting said inbound data signal includes transmitting a random access request field and transmitting a data response field.

15. A system for transmitting and receiving outbound and inbound data signals through a satellite communications network, said system having a network data rate and including a satellite and an end user transceiver, the system comprising:

a half-duplex mobile transceiver for transmitting and receiving said outbound and inbound data signals, respectively, for spreading the inbound data signal from the network data rate to a reduced data rate having an increased signal-to-noise ratio using a spread sequence, and for despreading said outbound data signal from the reduced data rate to the network data rate;

an earth station, coupled to said end user transceiver, for transmitting and receiving said outbound and inbound data signals, wherein the earth station includes means for spreading said outbound data from the network data rate to the reduced data rate using said spread sequence, and for despreading the inbound data from the reduced data rate to the network data rate; and wherein said end user transceiver includes means for transmitting said outbound data signal, and means for receiving said inbound data signal.

16. A system for transmitting and receiving outbound and inbound data signals through a satellite communications network, said system having a network data rate and including a satellite and an end user transceiver, the system comprising:

a half-duplex mobile transceiver for transmitting and receiving said outbound and inbound data signals, respectively, for spreading the inbound data signal from the network data rate to a reduced data rate having an increased signal-to-noise ratio using a spread sequence, and for despreading said outbound data signal from the reduced data rate to the network data rate; said mobile transceiver comprising:

a plurality of mixers for transforming said outbound data signal from said transmission frequency band to said base frequency band, and for translating said outbound data signal into in-phase and quadrature-phase outbound data signals;

a plurality of analog-to-digital converters, coupled to said plurality of mixers, for analog-to-digital converting said in-phase and quadrature-phase outbound data signals;

a digital signal processor, coupled to said plurality of analog-to-digital converters, for demodulating, synchronizing, and despreading said analog-to-digital converted in-phase and quadrature-phase outbound data signals, and for modulating, spreading, and translating into in-phase and quadrature-phase inbound data signals said inbound data signal;

a plurality of digital-to-analog converters, coupled to said digital signal processor, for digital-to-analog converting said spread and modulated in-phase and quadrature-phase inbound data signals;

a plurality of second mixers, coupled to said digital-to-analog converters, for transforming said digital-to-analog converted in-phase and quadrature-phase inbound data signals from said base frequency band to said transmission frequency band; and an earth station, coupled to said end user transceiver, for transmitting and receiving said outbound and inbound data signals, wherein the earth station includes means for spreading said outbound data from the network data rate to the reduced data rate using said spread sequence, and for despreading the inbound data from the reduced data rate to the network data rate;

said end user transceiver includes means for transmitting said outbound data signal, and means for receiving said inbound data signal.

17. The system recited in claim 16, wherein said mobile transceiver further comprises:

a plurality of low-pass filters, coupled to said plurality of mixers and to said plurality of analog-to-digital converters, for limiting the base frequency band of said in-phase and quadrature-phase outbound data signals; and a plurality of second low-pass filters, coupled to said plurality of digital-to-analog converters and to said plurality of second mixers, for limiting the base frequency band of said digital-to-analog converted in-phase and quadrature-phase inbound data signals.

18. The system recited in claim 17, wherein said in-phase outbound data signal has a predetermined wide bandwidth or a predetermined narrow bandwidth;
    wherein the plurality of low-pass filters includes a wide band in-phase filter for a first limiting of the frequency band if the in-phase outbound data signal is of the predetermined wide bandwidth, and a narrow band in-phase filter for a second limiting the frequency band if the in-phase outbound data signal is of the predetermined narrow bandwidth; and
    wherein the plurality of analog-to-digital converters includes a wide band converter for a first analog-to-digital conversion if the transformed in-phase outbound data signal is of the predetermined wide bandwidth, and a narrow band converter for a second analog-to-digital conversion if the transformed in-phase outbound data signal is of the predetermined narrow bandwidth.

19. The system recited in claim 18, wherein said mobile transceiver further comprises:
    means, coupled to said plurality of mixers, for amplifying and narrowing the transmission frequency band of said outbound data signal;
    means, coupled to said plurality of second mixers, for adding said limited in-phase and quadrature-phase inbound data signals to obtain a transmission signal; and
    an amplifier, coupled to said adding means, for amplifying said transmission signal.

20. The system recited in claim 16, wherein said mobile transceiver further comprises:
    means, coupled to said plurality of mixers and to said plurality of second mixers, for generating a tuning frequency;
    wherein said outbound data signal is transformed from said transmission frequency band to said base frequency band in accordance with said tuning frequency; and
    wherein said modulated and spread inbound data signal is transformed from said base frequency band to said transmission frequency band in accordance with said tuning frequency.

21. The system recited in claim 15, wherein said mobile transceiver further comprises an antenna for collecting and receiving signals in the range of 1570 MHz to 1580 MHz.

22. The system recited in claim 15, wherein said outbound data signal includes a housekeeping field, a poll-/access grant field, and a broadcast data field; and
    wherein said inbound data signal includes a random access request field and a data response field.

23. The system recited in claim 15, said system further comprising a second earth station, coupled to said earth station, for transmitting information; and
    a second mobile transceiver, coupled to said second earth station, for transmitting and receiving data signals.

24. A system for transmitting and receiving outbound and inbound data signals through a satellite communications network, said system having a network data rate and including a satellite and an end user transceiver, the system comprising:
    a first and second half-duplex mobile transceivers for transmitting and receiving said outbound and inbound data signals, respectively, for spreading the inbound data signal from the network data rate to a reduced data rate having an increased signal-to-noise ratio using a spread sequence, and
    for despreading said outbound data signal from the reduced data rate to the network data rate;
    a first earth station, coupled to said end user transceiver, for transmitting and receiving said outbound and inbound data signals, wherein the earth station includes means for spreading said outbound data from the network data rate to the reduced data rate using said spread sequence and for despreading the inbound data from the reduced data rate to the network data rate;
    a second earth station coupled to the first earth station for transmitting information;
    said end user transceiver includes means for transmitting said outbound data signal, and means for receiving said inbound data signal, a second earth station, coupled to said earth station, for transmitting information; and said first and second mobile transceivers comprising:
    a plurality of mixers for transforming said outbound data signal from said transmission frequency band to said base frequency band, and for translating said outbound data signal into in-phase and quadrature-phase outbound data signals;
    a plurality of analog-to-digital converters, coupled to said plurality of mixers, for converting said in-phase and quadrature-phase outbound data into digital signals;
    a digital signal processor, coupled to said plurality of analog-to-digital converters, for demodulating, synchronizing, and despreading said analog-to-digital converted in-phase and quadrature-phase outbound data signals, and for modulating, spreading, and translating said inbound data signal into in-phase and quadrature-phase inbound data signals;
    a plurality of digital-to-analog converters, coupled to said digital signal processor, for digital-to-analog converting said spread and modulated in-phase and quadrature-phase inbound data signals; and
    a plurality of second mixers, coupled to said digital-to-analog converters, for transforming said analog converted in-phase and quadrature-phase inbound data signals from said base frequency band to said transmission frequency band.

25. The system recited in claim 24, wherein said mobile transceiver further comprises:
    a plurality of low-pass filters, coupled to said plurality of mixers and to said plurality of analog-to-digital converters, for limiting the base frequency band of said in-phase and quadrature-phase outbound data signals; and
    a plurality of second low-pass filters, coupled to said plurality of digital-to-analog converters and to said plurality of second mixers, for limiting the base frequency band of said digital-to-analog converted in-phase and quadrature-phase inbound data signals.

26. The system recited in claim 25, wherein said in-phase outbound data signal has a predetermined wide bandwidth or a predetermined narrow bandwidth;
    wherein the plurality of low-pass filters includes a wide band in-phase filter for a first limiting of the frequency band if the in-phase outbound data signal is of the predetermined wide bandwidth, and a narrow band in-phase filter for a second limiting of the frequency band if the in-phase outbound data signal is of the predetermined narrow bandwidth; and wherein the plurality of analog-to-digital converters includes a wide band converter for a first analog-to-digital conversion if the transformed in-phase outbound data signal is of the predetermined wide bandwidth, and a narrow band converter for a second analog-to-digital conversion if the transformed in-phase outbound data signal is of the predetermined narrow bandwidth.

27. The system recited in claim 26, wherein said mobile transceiver further comprises:
means, coupled to said plurality of mixers, for amplifying and narrowing the transmission frequency band of said outbound data signal;
means, coupled to said plurality of second mixers, for adding said limited in-phase and quadrature-phase inbound data signals to obtain a transmission signal; and
an amplifier, coupled to said adding means, for amplifying said transmission signal.

28. The system recited in claim 24, wherein said mobile transceiver further comprises:
means, coupled to said plurality of mixers and to said plurality of second mixers, for generating a tuning frequency;
wherein said outbound data signal is transformed from said transmission frequency band to said base frequency band in accordance with said tuning frequency; and
wherein said modulated and spread inbound data signal is transformed from said base frequency band to said transmission frequency band in accordance with said tuning frequency.

29. The system recited in claim 23, wherein said mobile transceiver further comprises an antenna for collecting and receiving signals in the range of 1570 MHz to 1580 MHz.

30. The system recited in claim 23, wherein said outbound data signal includes a housekeeping field, a poll/access grant field, and a broadcast data field; and
wherein said inbound data signal includes a random access request field and a data response field.

31. A method for receiving and transmitting outbound and inbound data signals through a satellite communications network having a transmission frequency band and a base frequency band, comprising:
translating the outbound data signal into in-phase and quadrature-phase outbound data signals;
transforming the in-phase and quadrature-phase outbound data signals from said transmission frequency band to said base frequency band;
converting the transformed outbound data from analog to digital signals; demodulating, synchronizing, and despreading the converted outbound data signals; modulating, spreading, and translating said inbound data signal into in-phase and quadrature-phase inbound data signals converting the modulated and spread in-phase and quadrature-phase inbound data into analog signals; and transforming the analog inbound data signals from said base frequency band to said transmission frequency band.

32. The method recited in claim 31, further comprising the steps of:
amplifying said outbound data signal and narrowing the transmission frequency band of said outbound data signal;
limiting the base frequency band of said transformed outbound data signals;
limiting the base frequency band of said digital-to-analog converted inbound data signals;
adding the transformed inbound data signals to obtain a transmission signal; and
amplifying said transmission signal.

33. The method recited in claim 32, wherein said transformed in-phase outbound data signal has a predetermined wide bandwidth or a predetermined narrow bandwidth; wherein the substep of limiting the base frequency band of the transformed in-phase outbound data signal includes a first limiting of the frequency band if the transformed in-phase outbound data signal is of the predetermined narrow bandwidth, or second limiting of the frequency band if the transformed in-phase outbound data signal is of the predetermined wide bandwidth; and wherein the substep of converting the transformed in-phase outbound data from analog to digital signal includes a first conversion if the transformed in-phase outbound data signal is of the predetermined narrow bandwidth, or a second conversion if the transformed in-phase outbound data signal is of the predetermined wide bandwidth.

34. The method recited in claim 31, further comprising the step of:
generating a tuning frequency;
wherein the step of transforming the in-phase and quadrature-phase outbound data signals from said narrowed transmission frequency band to said base frequency band is performed in accordance with said tuning frequency; and
wherein the step of transforming the inbound analog data signals from said base frequency band to said transmission frequency band is performed in accordance with said tuning frequency.

35. The method recited in claim 31, further comprising the step of collecting said outbound data signal in the range of 1570 MHz to 1580 MHz.

36. A transceiver for transmitting and receiving outbound and inbound data signals through a satellite communications network, said transceiver operating in a half-duplex mode and having a base frequency band and a transmission frequency band,, said transceiver comprising:
a plurality of mixers for transforming said outbound data signal from said transmission frequency band to said base frequency band, and for translating said outbound data signal into in-phase and quadrature-phase outbound data signals;
a plurality of analog-to-digital converters, coupled to said plurality of mixers, for converting said transformed and translated outbound data into digital signals;
a digital signal processor, coupled to said plurality of analog-to-digital converters, for demodulating, synchronizing, and despreading said digital outbound data signals, and for modulating, spreading, and translating said inbound data signal into in-phase and quadrature-phase inbound data signals;
a plurality of digital-to-analog converters, coupled to said digital signal processor, for converting said spread and modulated in-phase and quadrature-phase inbound data into analog signals; and a plurality of second mixers, coupled to said digital-to-analog converters, for transforming said analog in-phase and quadrature-phase inbound data signals from said base frequency band to said transmission frequency band..

37. The transceiver of claim 36, further comprising:

a plurality of low-pass filters, coupled to said plurality of mixers and to said plurality of analog-to-digital converters, for limiting the base frequency band of said in-phase and quadrature-phase outbound data signals; and a plurality of second low-pass filters, coupled to said digital-to-analog converters and to said plurality of second mixers, for limiting the frequency band of said analog inbound data signals;

38. The transceiver of claim 37, wherein said in-phase outbound data signal has a predetermined wide bandwidth or a predetermined narrow bandwidth;

wherein the plurality of low-pass filters includes a wide band in-phase filter for a first limiting of the frequency band if the in-phase outbound data signal is of the predetermined wide bandwidth, and a narrow band in-phase filter for a second limiting of the frequency band if the in-phase outbound data signal is of the predetermined narrow bandwidth; and wherein the plurality of analog-to-digital converters includes a wide band converter for a first analog-to-digital conversion if the transformed in-phase outbound data signal is of the predetermined wide bandwidth, and a narrow band converter for a second analog-to-digital conversion if the transformed in-phase outbound data signal is of the predetermined narrow bandwidth.

39. The transceiver of claim 38, further comprising:

means, coupled to said plurality of mixers, for amplifying said outbound data signal and for narrowing the frequency bandwidth of said outbound data signal;

means, coupled to said plurality of second mixers, for adding said limited inbound data signals to obtain a transmission signal; and an amplifier, coupled to said adding means, for amplifying said transmission signal.

40. The transceiver of claim 36, further comprising an antenna, coupled to said amplifying and narrowing means and to said amplifier, for collecting and radiating outbound and inbound data signals, said antenna operating in the range of 1570 MHz to 1580 MHz.

41. The transceiver of claim 40, further comprising means, coupled to said plurality of mixers and to said plurality of second mixers, for generating a tuning frequency;

wherein said outbound data signal is converted from said transmission frequency band to said base frequency band in accordance with said tuning frequency; and wherein said modulated and spread inbound data signal is converted from said base frequency band to said transmission frequency band in accordance with said tuning frequency.

42. The transceiver of claim 39, further comprising a data processor, coupled to said digital signal processor, for interfacing with a user of said transceiver.

43. A system for transmitting and receiving outbound and inbound data signals through a satellite communications network, said system having a network data rate and including a satellite and an end user transceiver, the system comprising: a half-duplex mobile transceiver for transmitting and receiving said outbound and inbound data signals, respectively, the transceiver including means for spreading the inbound data signal from the network data rate to a reduced data rate having an increased signal-to-noise ratio using a spread sequence, and including means for despreading said outbound data signal from the reduced data rate to the network data rate; and an earth station, coupled to said end user transceiver, for transmitting and receiving said outbound and inbound data signals.

44. The system recited in claim 43, wherein said end user transceiver includes means for transmitting said outbound data signal and for spreading said outbound data signal from the network data rate to the reduced data rate using said spread sequence, and means for receiving said inbound data signal and for despreading said inbound data signal from the reduced data rate to the network data rate.

* * * * *